June 29, 1965  N. M. REISCHL  3,191,909
SPOT WELD SEPARATOR
Filed March 29, 1963
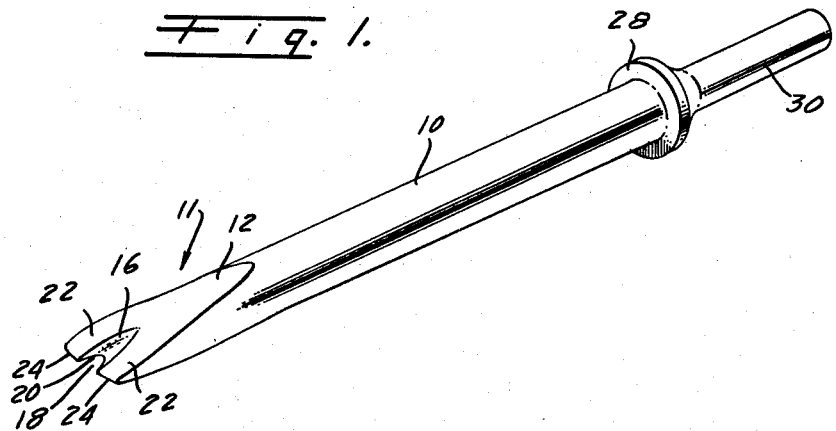
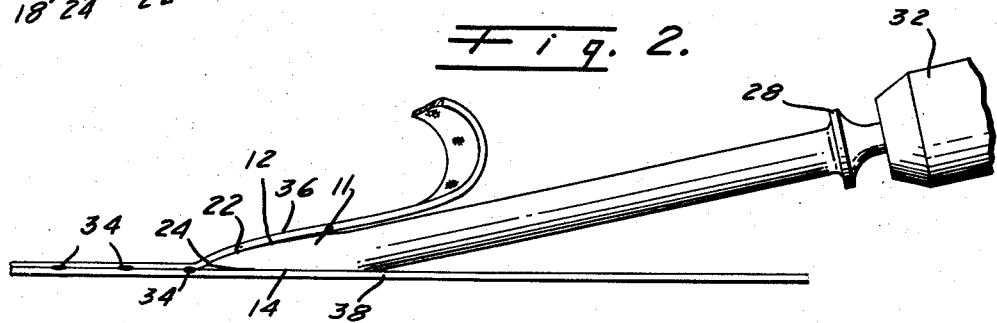
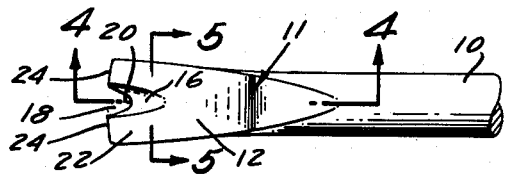
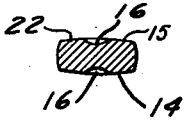
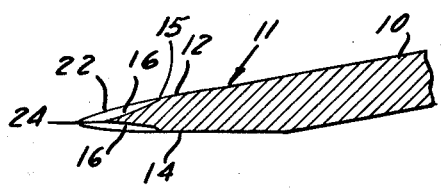
Norbert M. Reischl
INVENTOR.
BY
Attorney United States Patent Office 3,191,909
Patented June 29, 1965

3,191,909
SPOT WELD SEPARATOR
Norbert M. Reischl, 732 E. Mar Vista, Whittier, Calif.
Filed Mar. 29, 1963, Ser. No. 268,929
3 Claims. (Cl. 254—104)

This invention relates generally to tools and relates more particularly to a spot weld separator for use with a pneumatic hammer or actuator.

While the invention has particular utility embodied in a spot weld separator, and is shown and described thus embodied, it is to be understood that its utility is not confined thereto.

There are various problems and difficulties involved in separating pieces of material, such as sheet metal, which have been secured together by spot welding or a spot welded seam, and it is an object of the present invention to solve these problems and overcome said difficulties.

It is another object of the present invention to provide a tool which will quickly and easily separate spot welds or spot weld seams.

It is still another object of the invention to provide a device of this character that will not cut the spot welded sheets of material during separation of said spot welded sheets.

It is a further object of the invention to provide a device of this character that will force the weld spots apart by a wedging action.

It has been found that while most of the weld spots securing sheets of metal together will separate under the wedging action of the present invention, occasionally there will be a spot that will not separate under the wedging action of the present tool and it is therefore a still further object to provide a device of the present character that will cut such welded spots and thus effect separation of such spot welds as will not separate from the wedging action or force of the present tool.

It is another object of the invention to provide a device of this character that is simple in construction.

It is still another object of the invention to provide a device of this character that is sturdy and durable.

A further object of the invention is to provide a tool of this character that has a relatively long life.

It is a still further object of the invention to provide a device of this character that is relatively inexpensive to manufacture.

In summary, the nature and substance of the invention resides in the provision of a tool adapted for longitudinal actuation by a power operated mechanism for separating the weld spots of weld seams and the like and said tool has a shank with a head at the forward free end, said head being wedge shaped with oppositely arranged flat sides, the apex of the head being at the forward leading end and said flat sides have oppositely arranged grooves therein extending rearwardly from the forward leading end of the head, the forward end portion of the grooves forming a notch which is curved concavely at the closed inner end and is sharp to provide a sharp cutting edge spaced inwardly from each of said flat sides, the notch dividing the forward end portion of the head into a pair of members the forward edges of which form the apex end of the head and said edges are blunt.

The characteristics and advantages of the invention are further sufficiently referred to in connection with the following detailed description of the accompanying drawings, which illustrate an exemplary embodiment. After considering this example, skilled persons will understand that many variations may be made without departing from the principles disclosed, and I contemplate the employment of any structures, arrangements or modes of operation that are properly within the scope of the appended claims.

Referring to the drawings, which are for illustrative purposes only:

FIG. 1 is a perspective view of a spot weld separator tool embodying the present invention;

FIG. 2 is a side view of the device separating the spot welds of a spot weld seam;

FIG. 3 is a top plan view of the operating end of the device;

FIG. 4 is a sectional view taken on line 4—4 of FIG. 3, and

FIG. 5 is a sectional view taken on line 5—5 of FIG. 3.

Referring more particularly to the drawings, the tool comprises a shank 10 having a head indicated generally at 11 at its forward end. This head is flattened into a wedge shape, there being oppositely arranged flattened surfaces or sides 12 and 14, the surface 12 having a slight convex, transverse, slightly rounded or curved ridge or hump at 15 which facilitates guiding the device when in use.

The forward end of the device is not only wedge shaped with the apex at the end, but is also widened toward the free end. At the forward free end of the wedge shaped end there are grooves 16 in each of the sides 12 and 14, said grooves extending a limited distance from the front end of the device and at their line of meeting form a concave notch 18. The closed end 20 of said notch is sharp to form a sharp concavely curved cutting edge which is spaced inwardly from both surfaces 12 and 14. Thus, when the device is in operation, separating spot welds or a spot weld seam securing together pieces of sheet metal, the sharp cutting edge cannot come into contact with either of said sheets of metal.

The forward end of the device is forked, being separated into a pair of side members 22, the under sides of which have slightly upwardly and forwardly curved free end portions 23. The forward free ends 24 of the members 14 are blunt or rounded and because of these blunt ends and upwardly curved free end portions 23 the spot welded sheets of material are effectively separated by the tool without cutting of said sheet by said tool.

At the rear of the shank 10 there is an annular flange 28 from which there is a rearwardly extending stem 30 of reduced diameter relative to the shank 10 but in axial alignment therewith. This stem is adapted to be received in a chuck or other tool securing device 32 of an actuator of any well known character which vibrates or oscillates the tool longitudinally. The actuator may be a pneumatic hammer or like device or it may be electrically or otherwise operated.

In FIG. 2 the device is shown separating the spot welds 34 of a spot weld seam securing together pieces of sheet metal 36 and 38. It will be readily apparent that the blunt or rounded forward ends 24 of the members 22 will not cut into either of the pieces of sheet metal but will slide forwardly and provide the entering portion of the wedge defined by the sides or surfaces 12 and 14, the tool being vibrated longitudinally by the pneumatic actuator. As the tool moves forwardly the welded spots 34 enter the notch 18 and are quickly and easily separated.

As pointed out above, should any of the spot welds 34 resist the wedging force of the forward end of the tool such weld spot will pass to the inner end of notch 18 and be cut through by the sharp cutting edge 20. Thereafter the wedge shaped head of the tool will move forwardly to wedge apart and separate the next welded spot, or cut same if the wedging action will not force it apart.

It is thought that the invention and its attendant advantages will be understood from the foregoing description and it is believed that it will be apparent that various changes may be made in the form, construction and arrangement of the parts of the invention without departing from the spirit and scope thereof or sacrificing its material advantages, the form hereinbefore described being merely for the purpose of disclosing one embodiment.

I claim:
1. A mechanism for separating the weld spots of spot weld seams and the like, comprising:
   (A) a separating tool having
      (a) a shank,
      (b) a head at the forward free end of said shank, said head being wedge shaped with oppositely arranged flat sides, the apex of said head being at the forward leading end, said head also flaring toward said forward leading end, said head having oppositely arranged grooves in the flat sides defining the wedge, said grooves extending rearwardly from the forward leading end and forming a notch at the forward end of said wedge which has a concavely curved closed inner end, said inner end being a sharp cutting edge spaced inwardly from each of said flat sides, said notch dividing the forward end portion of the head into a pair of members, the forward edges of said members forming the apex end of the head being rounded,
      (c) an annular flange at the rear of the shank,
      (d) a stem extending rearwardly from said flange;
   (B) and a pneumatic actuator to which said stem is removably secured, said actuator imparting longitudinal vibratory movements to said separator tool.

2. A longitudinally actuatable tool for separating the weld spots of spot weld seams and the like, comprising:
   (A) a shank;
   (B) a head at the forward free end of said shank, said head being wedge shaped with oppositely arranged flat sides, the apex of said head being at the forward leading end, said head also flaring toward said forward leading end, said head having oppositely arranged grooves in the flat sides defining the wedge, said grooves extending rearwardly from the forward leading end and forming a notch at the forward end of said wedge which is concavely curved at the closed inner end, said inner end being a sharp cutting edge spaced inwardly from each of said flat sides, said notch dividing the forward end portion of the head into a pair of members, the forward edges of said members forming the apex end of the head being rounded;
   (C) an annular flange at the rear of the shank;
   (D) and a stem extending rearwardly from said flange, adapted to be removably secured in a pneumatic actuator.

3. In a longitudinally actuatable tool for separating the weld spots of spot weld seams and the like:
   (A) a shank;
   (B) a head at the forward free end of said shank, said head being wedge shaped with oppositely arranged flat sides, the apex of said head being at the forward leading end, said head having oppositely arranged grooves in the flat sides defining the wedge, said grooves extending rearwardly from the forward leading end and the forward end portion of said grooves forming a notch at the forward end of said wedge, said notch being concavely curved at the closed inner end, said inner end being a sharp cutting edge spaced inwardly from each of said flat sides, said notch dividing the forward end portion of the head into a pair of members, the forward edges of said members forming the apex end of the head being blunt;
   (C) and a means at the end of the shank opposite the head adapted to be removably secured in an actuator.

References Cited by the Examiner

UNITED STATES PATENTS

| 40,163 | 10/63 | Fitch | 30—294 |
|---|---|---|---|
| 1,363,014 | 12/20 | Racicot | 254—25 |
| 1,471,062 | 10/23 | Riblett | 81—15 |
| 2,422,202 | 6/47 | McClure | 30—168 |

WILLIAM FELDMAN, *Primary Examiner.*

MILTON S. MEHR, *Examiner.*